United States Patent [19]

Wood

[11] Patent Number: 4,971,368
[45] Date of Patent: Nov. 20, 1990

[54] SEAL FOR CONNECTING A TUBE TO A HOUSING MEMBER AND METHOD FOR FORMING SAME

[75] Inventor: Mark W. Wood, Jackson, Tenn.

[73] Assignee: The DeVilbiss Company, Toledo, Ohio

[21] Appl. No.: 467,799

[22] Filed: Jan. 17, 1990

[51] Int. Cl.$^5$ ............................................. F16L 27/10
[52] U.S. Cl. ..................................... 285/223; 277/189; 277/183; 285/379
[58] Field of Search ............... 285/223, 910, 231, 921, 285/918, 379; 277/183, 189

[56] References Cited

U.S. PATENT DOCUMENTS 2,717,792  9/1955  Pelley ............................ 285/223 X
4,732,397  3/1988  Gavin ............................ 285/223 X Primary Examiner—Dave W. Arola
Assistant Examiner—Heather Chun
Attorney, Agent, or Firm—MacMillan, Sobanski & Todd

[57] ABSTRACT

An improved fluid tight seal for connecting a tube to a housing member. A generally D-shaped opening is formed in the housing member. The opening has a flat open side where the housing member is secured to and abuts a flat surface. A groove or slot extends around the opening. The slot has enlarged corners adjacent the flat side. The tube is provided with an annular groove adjacent the end to be attached to the housing member. The tube groove receives a resilient seal which is shaped to slide into the housing member slot. The seal has corner tabs which fill the enlarged slot corners. Prior to securing the housing member to the flat surface, the seal extends slightly from the slot. When the housing member is secured to the surface, the seal is compressed to form a high pressure resilient seal between the housing member and the tube. The seal is particularly useful for connecting a compressed air outlet tube to the cylinder head of an air compressor.

7 Claims, 1 Drawing Sheet

SEAL FOR CONNECTING A TUBE TO A HOUSING MEMBER AND METHOD FOR FORMING SAME

TECHNICAL FIELD

The invention relates to seals and more particularly to an improved high pressure fluid tight seal for connecting a tube to a housing member and to a method for forming such a seal. The seal is suitable, for example, for connecting an air outlet tube to an air compressor cylinder head.

BACKGROUND ART

In some applications, it is necessary to connect a tube to a housing member to provide a high pressure fluid tight connection. For example, in reciprocating piston air compressors, it is necessary to connect an air outlet tube to a cylinder head. For safety reasons, the connection between the tube and the compressor head must be capable of withstanding air pressures higher than the maximum rated compressor output pressure. In the past, a compression fitting has been used to attach a tube to a compressor cylinder head. The standard compression fitting comprises a brass ring or sleeve which fits onto the tube end and a brass nut having a tapered internal surface for engaging the sleeve. As the nut is threaded into a tapped hole in the cylinder head, the tapered internal surface compresses the sleeve into the tube to form a fluid tight seal capable of withstanding high pressures. In some compressors, the brass compression ring or sleeve has been replaced with a silicon rubber ring. However, both types of compression fittings are expensive to manufacture and to install in the cylinder head. A major part of the cost results from the need to form a threaded opening in the cylinder head to receive the brass compression fitting nut. Further, securing the compression fitting to the cylinder head requires expensive manual labor.

DISCLOSURE OF INVENTION

According to the invention, an improved seal is provided for securing a tube to a housing member and specifically for securing a compressed air outlet tube to the cylinder head of an air compressor. The invention further encompasses the method for forming the seal. The cylinder head has a surface which is secured with a gasket to a cylinder head. A generally D-shaped opening is formed in the cylinder head with the flat side of the opening located at the edge which abuts the cylinder head gasket. A groove or slot extends around the opening and is provided with an enlarged corner on each end of the flat side of the opening. Typically the cylinder head is cast from a metal, such as aluminum. It should be appreciated that the D-shaped opening and the seal slot may be formed in the head during casting and that no drilling or machining of the head is required to attach the tube.

The seal is molded from a suitable elastomeric material such as a silicon rubber and is generally flat and is shaped with rounded edges to slide into the slot in the cylinder head opening. The seal edge which will abut a gasket between the cylinder head and a cylinder block or other adjacent surface is flat and projects past the gasket surface on the cylinder head. The seal has an opening with rounded edges for receiving the end of an air tube. The seal opening has a diameter slightly smaller than the tube diameter. An annular groove is formed adjacent the tube end for receiving the seal and for retaining the tube end in the seal. In assembling the compressor, the seal is merely slipped onto the tube end until it is located in the tube groove, the seal is then slipped into the slot in the cylinder head opening, and the cylinder head and a gasket are secured to the cylinder block with bolts. When the cylinder head bolts are tightened, the excessive seal material which projects past the gasket surface is forced into the slot to form a resilient high pressure fluid seal between the cylinder head and the tube. The ends of the flat side of the seal are tightly clamped to prevent seal failure along the flat side. The seal significantly reduces vibration stress in the tube which in the past sometimes caused metal fatigue in the tube.

Accordingly, it is an object of the invention to provide an improved fluid tight seal for securing a tube to a housing member and to provide a method for forming such a seal.

Other objects and advantages of the invention will be apparent from the following description and the attached drawings.

BEST MODE FOR CARRYING OUT THE INVENTION

Figure 1:
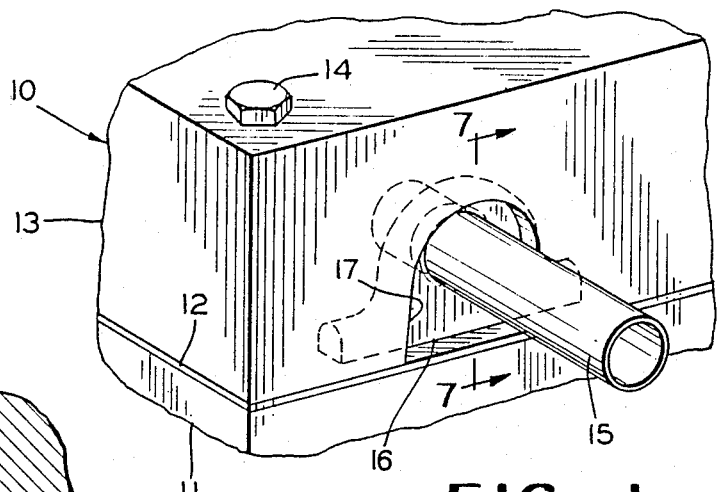
FIG. 1 is a fragmentary perspective view showing the seal of the invention forming an air tight seal between a pipe and the head of an air compressor.

Referring to FIG. 1 of the drawings, a fragmentary portion of a reciprocating piston compressor 10 is shown. The illustrated portion of the compressor 10 includes a cylinder block 11, a gasket 12, a cylinder head 13 and one of several bolts 14 which secures the cylinder head 13 to the cylinder block 11. It should be appreciated that what is referred to herein as the cylinder block 11 may be another part of a compressor such as a valve plate (not shown). A compressed air outlet tube 15 is resiliently secured to the cylinder head 13 by a seal 16 according to the invention. Preferably, the cylinder head 13 is cast from metal, such as from aluminum or an aluminum alloy. At the time of casting the head 13, a D-shaped opening 17 is formed through the cylinder head 13 at the desired location for securing the tube 15.

Figure 2:
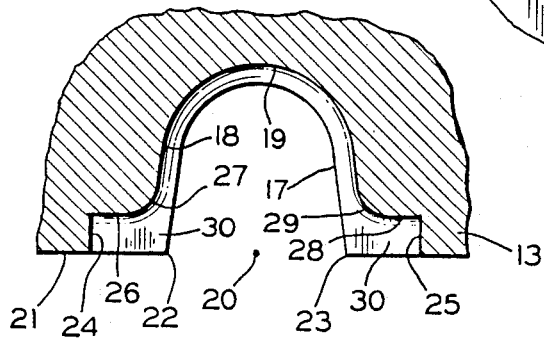
FIG. 2 a fragmentary cross sectional view through the grooved seal slot in the cylinder head.

The seal 16 is located in a slot or groove 18 as shown in FIG. 2. Since the slot 18 is formed in the cylinder head opening 17 at the time the cylinder head 13 is cast, no additional machining is required. The slot 18 has a modified D-shape. The slot 18 has a circular section 19 and an open side 20. The open side 20 is coplanar with a surface 21 on the cylinder head 13 which abuts the gasket 12 when the cylinder head 13 is attached to the cylinder block 11. Where the opening 17 abuts the gasket 12, the cylinder head 13 has sharp corners 22 and 23.

The slot 18 has enlarged corners 24 and 25 adjacent the opening corners 22 and 23, respectively. The enlarged corner 24 is generally rectangular and has a top 26 substantially parallel to the plane of the gasket surface 21. A radius 27 is formed where the top 26 of the enlarged corner 24 joins the circular section 19 of the slot 18. Similarly, the enlarged corner 25 is generally rectangular and has a top 28 which is substantially parallel to the plane of the gasket surface 21. A radius 29 is formed where the top 28 of the enlarged corner 25 joins the circular section 19 of the slot 18. The sides of the enlarged corners 24 and 25 of the slot 18 are closed by surfaces 30 of the cylinder head 13.

The seal 16 is molded from a suitable elastomeric material. For air compressors in which the cylinder head may become hot during operation, silicon rubber is a preferred material because of its heat resistant properties. However, it will be appreciated that the seal 16 may be made from other resilient materials which meet the strength and resiliency requirements and are capable of withstanding the operational environment.

Figure 3:
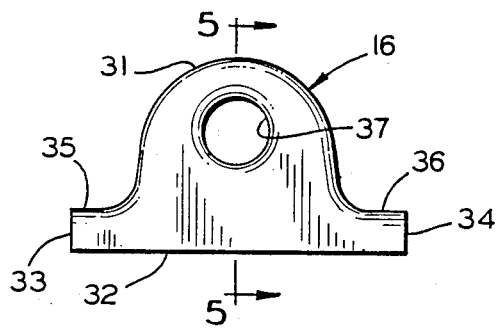
FIG. 3 is a side elevational view of a seal according to the invention.
Figure 4:
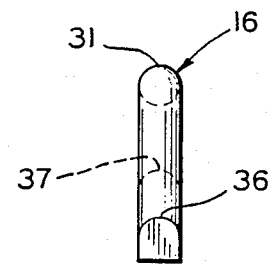
FIG. 4 is an end view of the seal of FIG. 3.
Figure 5:
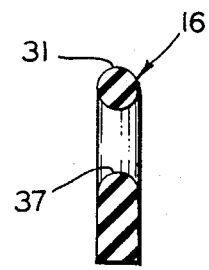
FIG. 5 is a cross sectional view through the seal as taken along line 5—5 of FIG. 3.

The seal 16 is shaped and sized to fit into and fill the cylinder head slot 18 and to extend slightly from the slot 18 below the gasket surface 21 on the head 13. Details of the seal 16 are shown in FIGS. 3-5. The seal 16 has a generally D-shaped body with a rounded edge 31 and a flat edge 32. Generally rectangular tabs 33 and 34 are formed to extend coplanar with the flat edge 32 on each side of the seal 16 where the rounded edge 31 joins the flat edge 32. The seal 16 is shaped and sized to slide into and closely engage the sides of the slot 18 with the rounded edge 31 located in the circular section 19, the tab 33 located in the enlarged slot corner 24 and the tab 34 located in the enlarged slot corner 25. Top surfaces 35 and 36 of the tabs 33 and 34, respectively, and the rounded edge 31 are rounded with a radius equal to one half of the thickness of the seal 16, as best seen in FIGS. 4 and 5. An opening 37 extends through a central area of the seal 16 for receiving the tube 15. The opening 37 has a diameter less than the diameter of the tube 15. The edges of the opening 37 also are rounded at a radius equal to one half of the thickness of the seal 16.

Figure 6:
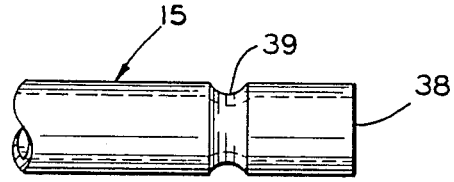
FIG. 6 is a fragmentary side view through an end of a tube showing a groove for retaining the seal of FIG. 3.

Details for a section of the tube 15 adjacent an end 38 are shown in FIG. 6. An annular groove 39 is formed in the tube 15 at a location spaced from the tube end 38. The groove 39 preferably is rounded in section and may have a radius the same as, slightly greater than, or less than one half the thickness of the seal 16.

Figure 7:
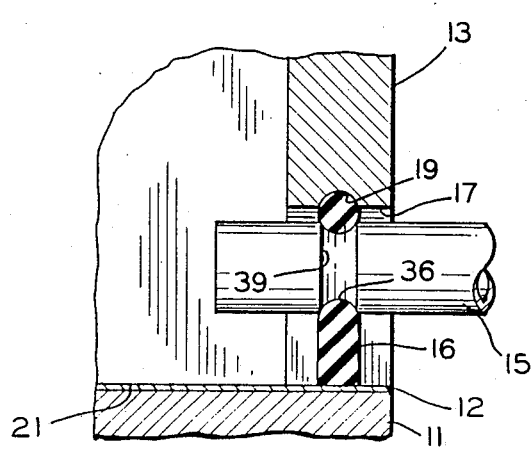
FIG. 7 is a fragmentary cross sectional view taken along line 7—7 of FIG. 1.

In assembling the tube seal, the tube end 38 is pushed into the seal opening 37 until the edges of the seal opening 37 engage the annular groove 39. The tube groove 39 retains the tube 15 in the seal opening 37. The seal 16 and attached tube 15 are then inserted into the slot 18 in the cylinder head opening 17. At this time, the flat edge 32 of the seal 16 extends parallel to and projects slightly past the plane of the cylinder head gasket surface 21. When the cylinder head 13 and the gasket 12 are secured to the cylinder block 11, the excess material in the seal is compressed to form a fluid tight seal between the tube 15, the cylinder head 13 and the gasket 12, as shown in FIG. 7. The seal tabs 33 and 34 are tightly clamped in the enlarged slot corners 24 and 25 to strengthen the seal 16 at the opening corners 22 and 23 and along the flat edge 32. Without the tabs 33 and 34, a twisting force on the tube 15 or an excessive air pressure could cause the seal 16 to separate from the slot 18 and the gasket 12 at one or both of the corners 22 and 23. The risk of seal failure without the clamped tabs 33 and 34 would be high, since the adjacent flat side 32 of the seal 16 is not retained in a slot or groove and has only flat contact with the gasket 12. Any seal separation from the adjacent surface of the slot 18 would result in a seal failure.

The seal 16 has several advantages over the rigid prior art compression fittings for connecting a tube to a housing member in that the seal's resiliency reduces vibrations transmitted to the tube 15. This in turn can reduce noise and can reduce metal fatigue which could otherwise eventually lead to a failure of the tube 15. The seal fits into a cast opening in the cylinder head and requires no drilling and machining of threads as was required for prior art seals. The novel design of the seal effectively provides a seal between a D-shaped opening cast in the cylinder head and an adjacent flat cylinder head gasket.

Although the seal has been described for attaching an air outlet tube to the cylinder head of an air compressor, it will be appreciated that the invention encompasses both the method and the structure for attaching a tube to any housing or first member adjacent a location where such housing or first member is secured to a surface of a second member. It will be apparent to those skilled in the seal and the compressor art that various modifications and changes may be made in the above described preferred embodiment of the invention without departing from the spirit and the scope of the following claims.

I claim:

1. An improved seal for connecting an end of a tube to a housing member at a location adjacent to where said housing member is attached at an edge to a second member comprising an opening in said housing member adjacent said edge, said opening having an open side at said edge, a groove extending around said housing member opening, said groove having enlarged corners adjacent said open side, a compressed elastomeric seal closing said opening, said seal filling said groove, an annular groove in said tube adjacent said tube end, and an opening in said seal, said tube extending through said seal opening and said compressed seal resiliently engaging said tube groove.

2. An improved seal for connecting an end of a tube to a housing member, as set forth in claim 1, wherein said seal has an edge which engages said second member along said open side of said housing member opening and tabs at ends of said edge, and wherein said tabs fill and are clamped by said second member in said enlarged groove corners.

3. An improved seal for connecting an end of a tube to a housing member, as set forth in claim 2, wherein said enlarged groove corners and said tabs are generally rectangular shaped.

4. An improved seal for connecting an end of a tube to a housing member, as set forth in claim 3, wherein an intermediate portion of said housing member groove between said enlarged corners is generally arcuate and has a rounded cross section.

5. An improved seal for connecting an end of a tube to a housing member, as set forth in claim 4, wherein said housing member groove is rounded between said intermediate portion and said enlarged groove corners.

6. An improved seal for connecting an end of a tube to a housing member, as set forth in claim 1, wherein said housing member opening is generally D-shaped having a flat side extending along said edge.

7. An improved seal for connecting an end of a tube to a housing member, as set forth in claim 1, wherein said seal is formed from an elastomeric silicon rubber.

* * * * *